US011865460B2

(12) United States Patent
Lin et al.

(10) Patent No.: US 11,865,460 B2
(45) Date of Patent: *Jan. 9, 2024

(54) SYSTEMS AND METHODS THAT ENABLE PLAYER MATCHING FOR MULTI-PLAYER ONLINE GAMES

(71) Applicant: Riot Games, Inc., Los Angeles, CA (US)

(72) Inventors: Jeffrey Lin, Los Angeles, CA (US); Paul Sottosanti, Santa Monica, CA (US)

(73) Assignee: Riot Games, Inc., Los Angeles, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/379,589

(22) Filed: Jul. 19, 2021

(65) Prior Publication Data

US 2022/0219089 A1 Jul. 14, 2022

Related U.S. Application Data

(63) Continuation of application No. 15/706,551, filed on Sep. 15, 2017, now Pat. No. 11,065,547, which is a continuation of application No. 13/551,338, filed on Jul. 17, 2012, now Pat. No. 9,795,887.

(51) Int. Cl.
| *A63F 13/795* | (2014.01) |
| *A63F 13/75* | (2014.01) |
| *H04L 67/306* | (2022.01) |
| *A63F 13/798* | (2014.01) |

(52) U.S. Cl.
CPC ............ *A63F 13/795* (2014.09); *A63F 13/75* (2014.09); *A63F 13/798* (2014.09); *H04L 67/306* (2013.01)

(58) Field of Classification Search
CPC ...... A63F 13/75; A63F 13/795; A63F 13/798; H04L 67/306
See application file for complete search history.

(56) References Cited

U.S. PATENT DOCUMENTS

| 6,128,660 A | 10/2000 | Grimm et al. |
| 7,451,161 B2 | 11/2008 | Zhu et al. |
| 7,677,970 B2 | 3/2010 | O'Kelley, II et al. |
| 8,303,416 B1 | 11/2012 | Thakkar et al. |

(Continued)

OTHER PUBLICATIONS

J. Riegelsberger, S. Counts, S. D. Farnham and B. C. Philips, "Personality Matters: Incorporating Detailed User Attributes and Preferences into the Matchmaking Process," 2007 40th Annual Hawaii International Conference on System Sciences (HICSS'07), Waikoloa, Hi, USA, 2007, pp. 87-87 (Year: 2007).*

(Continued)

*Primary Examiner* — Jason D Recek
(74) *Attorney, Agent, or Firm* — SHOOK, HARDY & BACON L.L.P.

(57) ABSTRACT

The field of the invention relates to multi-user online gaming systems, and more particularly to systems and methods that enable a spectator's experience for online active games. In a preferred embodiment, an online multiuser game system includes a user matching system configured to match users for a game session, wherein the user matching system is enabled to match a first user with another user based at least in part on behavior data in the first user's profile.

15 Claims, 13 Drawing Sheets

(56) References Cited

U.S. PATENT DOCUMENTS

| | | |
|---|---|---|
| 8,342,967 B2 | 1/2013 | Thakkar et al. |
| 8,348,765 B1 | 1/2013 | Thakkar et al. |
| 8,892,643 B2 | 11/2014 | Nevalainen |
| 8,977,631 B2 | 3/2015 | Sundaresan et al. |
| 2006/0042483 A1* | 3/2006 | Work .................. G06Q 10/00 101/91 |
| 2006/0143214 A1 | 6/2006 | Teicher |
| 2009/0170604 A1 | 7/2009 | Mueller et al. |
| 2009/0271212 A1 | 10/2009 | Savjani et al. |
| 2010/0083112 A1 | 4/2010 | Dawson et al. |
| 2011/0212770 A1 | 9/2011 | Ocko et al. |
| 2012/0142429 A1 | 6/2012 | Muller |
| 2012/0202602 A1* | 8/2012 | Buhr .................. A63F 13/12 463/43 |
| 2012/0271884 A1 | 10/2012 | Holmes et al. |
| 2013/0252737 A1 | 9/2013 | Mescon et al. |

OTHER PUBLICATIONS

"Virtual Worlds, Real Money, Security and Privacy in Massively-Multiplayer Online Games and Social and Corporate Virtual Worlds", European Network and information Security Agency, p. 80 (2008).

\* cited by examiner

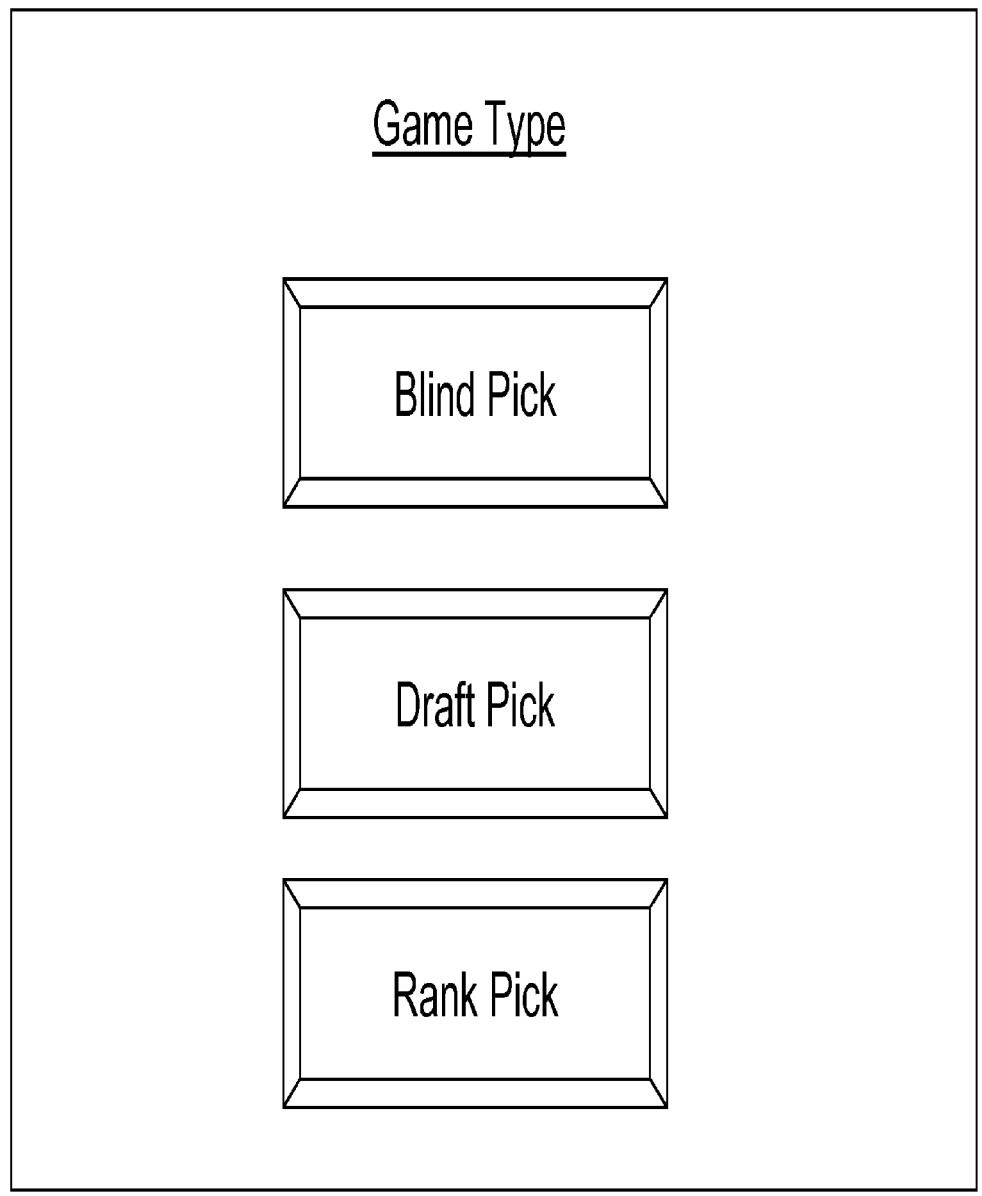

Report Player

Player(s) to be reported: X User 1

Select Behavior(s):

| Friendly |
| Team Oriented |
| Helpful |
| Honorable Opponent |
| Aggressive |
| Offensive Language |
| Unsportsmanlike |
| AFK |
| Unskilled |
| Inappropriate name |

Player rating (1-5 score): 4

Add Comment:

Commend

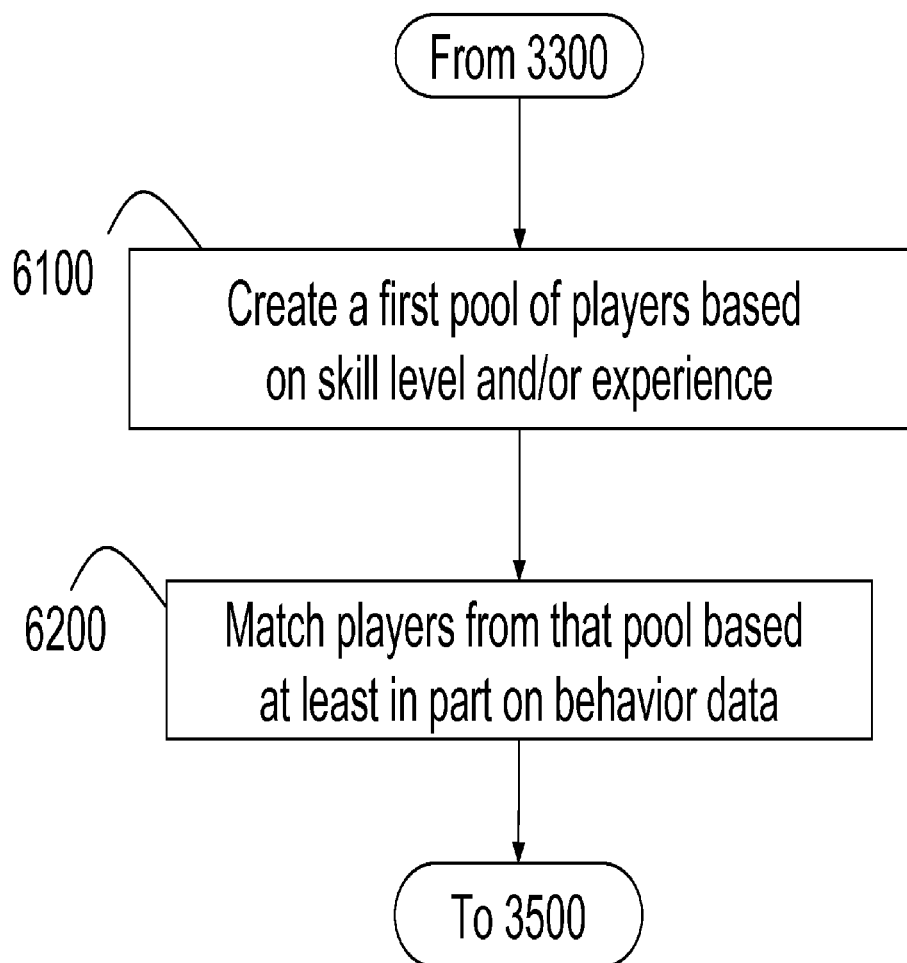

«SYSTEMS AND METHODS THAT ENABLE PLAYER MATCHING FOR MULTI-PLAYER ONLINE GAMES»

CROSS REFERENCE TO RELATED APPLICATION

This application is a continuation of U.S. patent application Ser. No. 15/706,551 filed on Sep. 15, 2017 which is a continuation of U.S. patent application Ser. No. 13/551,338 filed Jul. 17, 2015, which are hereby incorporated by reference in their entirety.

FIELD OF THE INVENTION

The field of the invention relates to multi-user online gaming systems, and more particularly to systems and methods that enable matching of players for online active games.

BACKGROUND OF THE INVENTION

In large multi-player online games, it is common for players to be matched randomly with other players. For example, in one popular multiplayer online game, League of Legends from Riot Games (leagueoflegends.com), with a base of millions of active users, a first player may opt to be matched with a group of other players unknown to the first player for a particular game. In such a scenario, the first player's experience (positively or negatively) may be dictated by how the other players behave during the game. For instance, other players may play aggressively, which an experienced player may enjoy but a novice player may not. There are systems that attempt to match players based on skill level and experience, but such characteristics may not be accurate predictors of whether the players in a particular game will have an enjoyable experience.

Accordingly, systems and methods to enable an improved player match system would be desirable.

SUMMARY OF THE INVENTION

The field of the invention relates to multi-user online gaming systems, and more particularly to systems and methods that enable a spectator's experience for online active games.

In a preferred embodiment, an online multiuser game system includes an online game session server system communicatively coupled to a public network for access by a plurality of users to establish a plurality of real-time interactive games sessions and a user profile database including a profile for each of the plurality of users, wherein the profile of a first user includes behavior data defined by a second user. The system further includes a user matching system coupled to the online game session server system and configured to match users for a game session, wherein the user matching system is enabled to match the first user with another user based at least in part on the behavioral data in the first user's profile.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 1d is another exemplary user interface known in the art;

FIG. 4 is an exemplary user interface in accordance with a preferred embodiment of the present invention;

FIG. 10 is another electronic process enabling player matching in accordance with a preferred embodiment of the present invention.

DETAILED DESCRIPTION OF THE PREFERRED EMBODIMENTS

State of the Art Systems

Figure 1A:
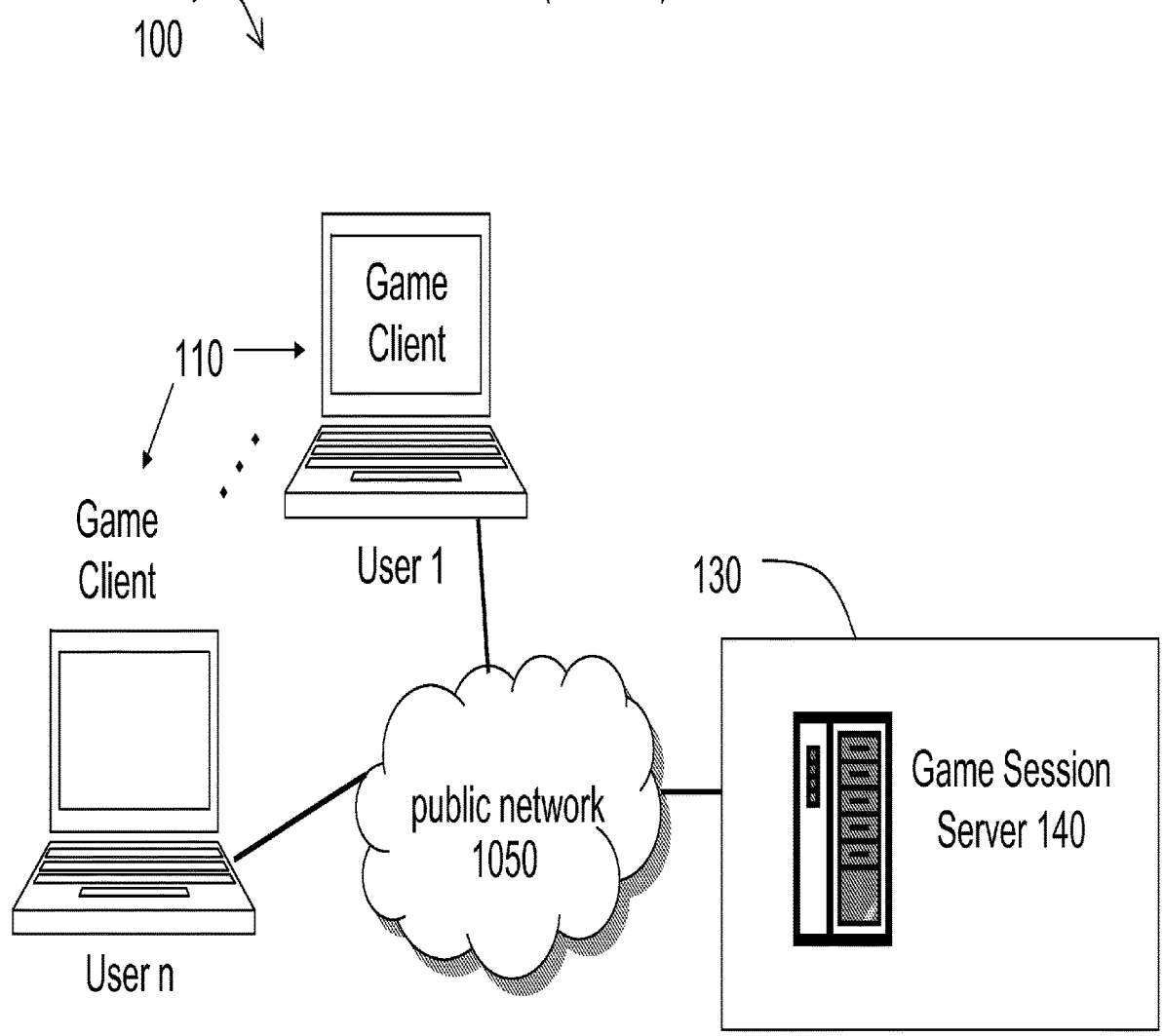
FIG. 1a is an exemplary diagram of a multiuser online game system known in the art.

Turning to FIG. 1 a, a large multiuser online game system 100 over a public network 1050, such as the Internet, is shown. An example of such a game system 100 known in the art is League of Legends (leagueoflegends.com). League of Legends is a session-based, multiplayer online battle-arena game where rival teams compete against one another for victory on highly stylized battlefields and landscapes.

Users can install a League of Legends game client on their personal computing device 110 to establish a game session over the public network 1050 with the game system's 100 datacenter 130, which provides the real-time online game interaction with the plurality of users 110.

Figure 1B:
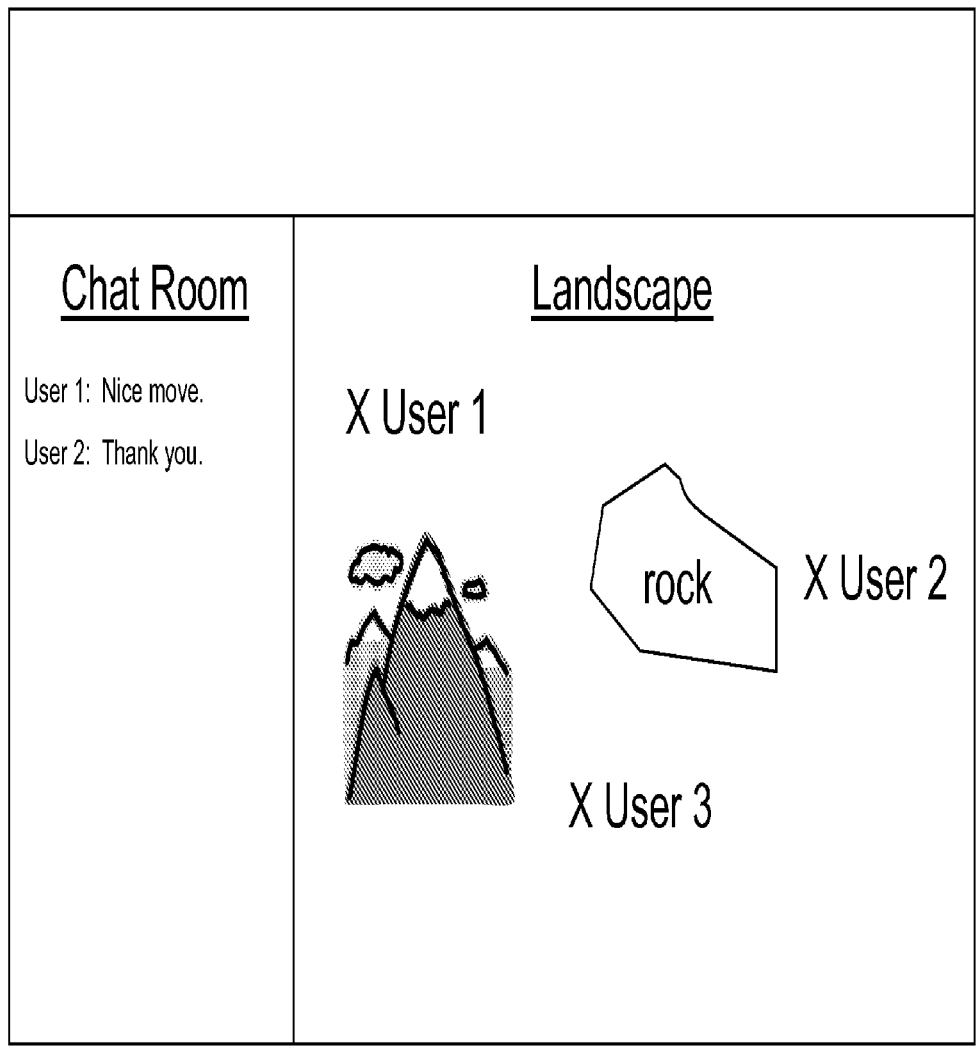
FIG. 1b is an exemplary user interface known in the art.

Turning to FIG. 1b, an example game client 110 user interface 120 is shown. In online games such as League of Legends, each user is generally represented by a personalized graphical avatar in the user interface 120, also referred to as "champion," (shown as "X" in this example), and the game client 110 user interface 120 may show the logical position of one user's avatar, X User 1, relative to another, X User 2 and X User 3 within a virtual landscape. The game client 110 user interface 120 may also include a chat interface ("Chat Room") that enables participating users to communicate with one another beyond interactions with the avatars (Xs).

The datacenter 130 includes a plurality of server systems operating on a plurality of server machines communicatively coupled to each other via the public network 1050 and/or a secure virtual private network (not shown). The server machines each include one or more processors, memory, an operating system, an input/output interface and network interface all known in the art. In accordance with a preferred embodiment, the datacenter 130 includes, among other things, a game session server system 140.

Figure 1C:
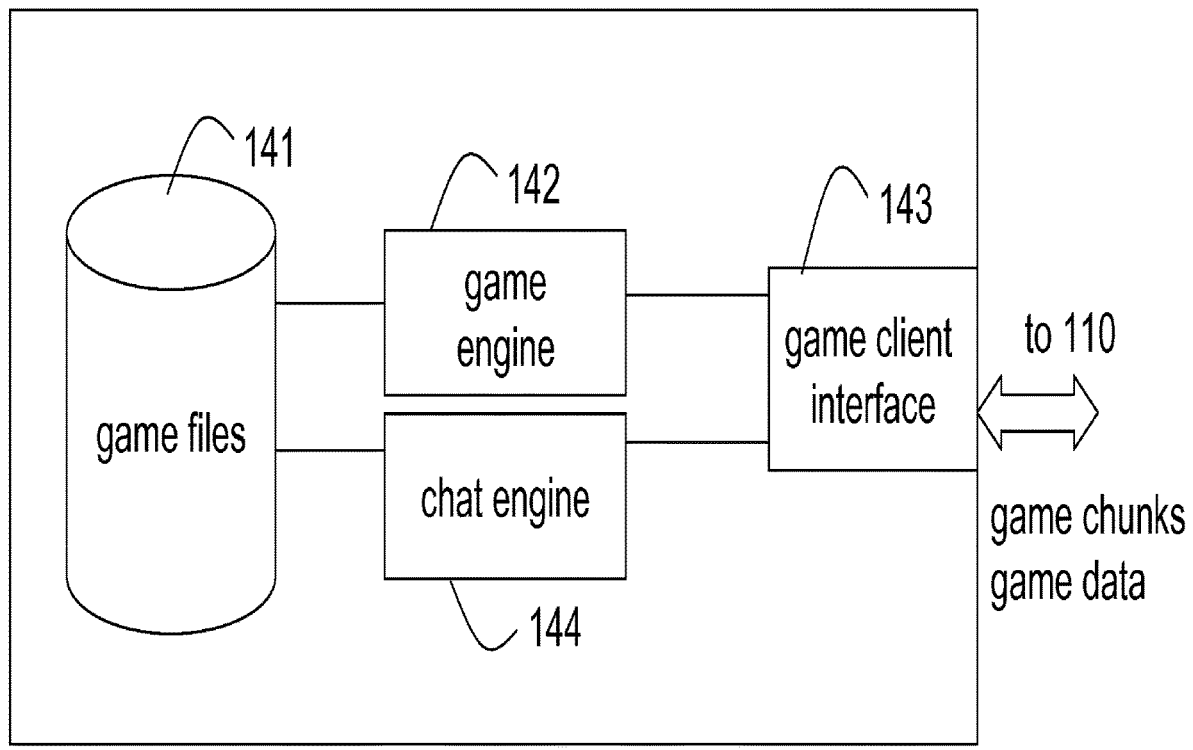
FIG. 1c is an exemplary diagram of a game session server known in the art.

Turning to FIG. 1c, a more detailed diagram of a game session server system 140 known in the art is shown. The game session server system 140 provides the game interaction with the users' game client 110 via the game client interface 143, which is generally an application interface known in the art accessible over the public network 1050 by the game client 110, e.g., in a traditional client server model. A game engine 142 coupled to the game client interface 143 is included to manage the interaction between the plurality of users 110 and the game system 100. The game session server system 140 further includes a chat engine 144 known in the art that enables the various users 110 participating in a particular game session to communicate with each other via text messages. Audio, pictures, and multimedia may also be exchanged with the chat engine 1440. Both the game engine 142 interactions as well as the chat messages exchanged can be recorded and stored in a game files database 141. This enables, among other things, replay and history analysis by not only the users but also the administrator and other systems.

Turning to FIG. 1d, in game system 100, when a user joins a game, the user must be matched with other users to team up with and/or compete against. Options for how the user is matched up with others can be displayed, as shown in the user interface 210. A user can specifically select its teammates and/or opponents (Draft Pick), or the user can allow the system 100 to select teammates and/or opponents from a list of active users who have selected the same option (Blind Pick or Rank Pick). In Rank Pick, the system 100 may match the user with other participants with similar experience and/or skill level. In Blind Pick, the match may be random. With Blind and Rank Pick, the user may or may not know who the other participants are, and thus, the user experience may be unpredictable.

Preferred Systems

Figure 2:
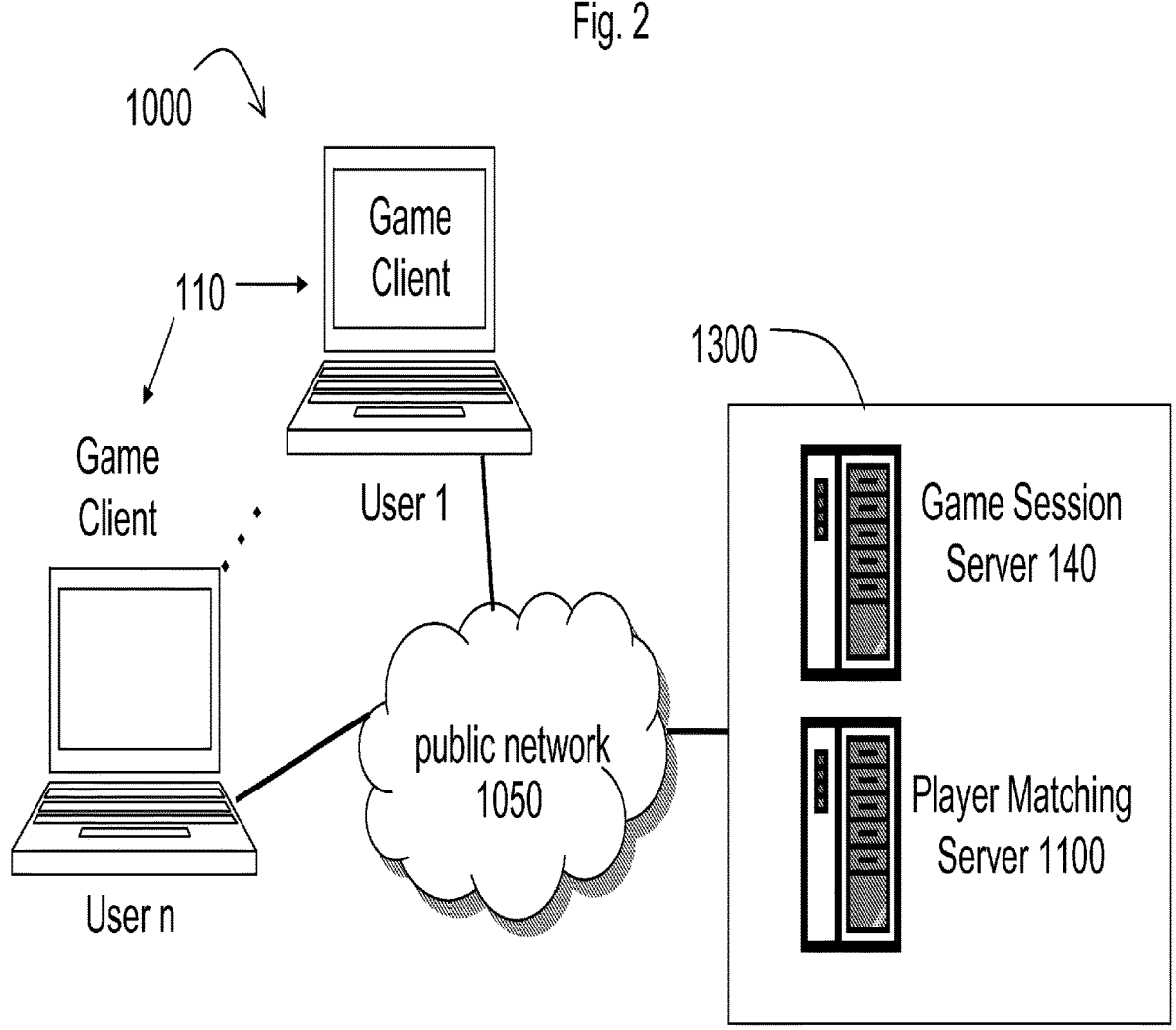
FIG. 2 is an exemplary diagram of a multi-user online game system in accordance with a preferred embodiment of the present invention.

Turning to FIG. 2, an online multi-user game system 1000 in accordance with a preferred embodiment of the present invention is shown. The system 1000 provides an improved player match system as will be described below. System 1000 includes a datacenter 1300 having a game session server system 140 as described above. The system 1000 also includes game clients 110 configured to access data center 1300 over the public network as described above. In accordance with a preferred embodiment, the system 1000 further includes a player matching server 1100 operatively coupled to the game session server system 140 that matches a player with other active players to form teams and opponents for a particular game session, using the systems and methods described below.

Figure 3:
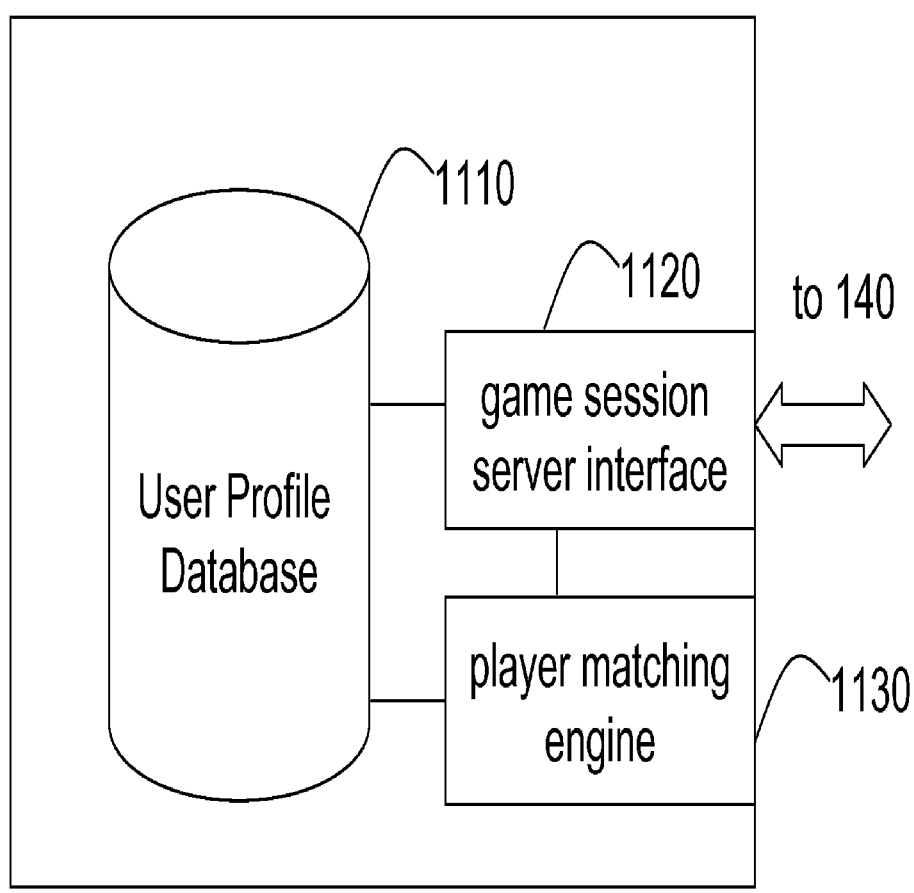
FIG. 3 is an exemplary diagram of a player matching server in accordance with a preferred embodiment of the present invention.

Turning to FIG. 3, a detailed diagram of a player matching server 1100 is shown. The player matching server 1100 includes an interface 1120 to the game session server 140. As will be described in more detail below, the interface 1120 receives feedback for a particular user from the game session server 140 to store in a user profile database 1110 as behavioral data for the particular user. The database 1110 may be implemented with technology known in the art, such as relational database and/or object oriented database technology known in the art. The player matching server 1100 also includes a player matching engine 1130 that matches players to form teams and opponents for a particular game session, as will be described in more detail below. The player matching engine 1130 is coupled to the user profile database 1110 and the game session server interface 1120.

Preferred Processes

Generally, when a player desires to have the system 1000 select its teammates and opponents for a particular game session (e.g., blind pick), in an attempt to ensure a positive experience for that player, the player matching server 1100 attempts to match that player with other players that may be compatible. This compatibility may include comparable skill and experience levels, but a more accurate assessment may require more data points. For example, a player may demonstrate and/or explicitly express a preference for aggressive players and/or team oriented players. In a preferred embodiment, such behavioral characteristics may be recorded and stored within the system 1000 and utilized to match potentially compatible players.

Generating, Reporting, and Storing Behavior Data

Turning to FIG. 4, a user interface 1150 provided by the system 1000 after a game session is shown. The user interface 1150 allows a user to identify one or more other users and identify the type of behavior exhibited during that game. For example, the one or more other users may have demonstrated behavior such as friendliness (e.g., a user who demonstrated sportsman-like conduct and would be someone a user would enjoy playing with again), helpfulness (e.g., a user who helped another user learn more about skills, items, champions or strategies in the game), or team oriented behavior (e.g., a user who communicated well with the team and maintained a positive attitude throughout the match, or who was a leader that united the team towards a common goal through great communication and leadership). For opponents, a user may have witnessed a user on an opposing team playing honorably (e.g., a user who was a great sport, who showed positive interactions between teams and who was admired as an opponent.).

Other behavior may include aggressive behavior, or a user may have used offensive language and negative personal comments in the chat session. A user may have also displayed unsportsmanlike conduct (e.g., a user may refuse to cooperate with its team or may assist the opposing team unethically, or may otherwise break ethical codes). A user may be using an ID with an inappropriate name. Another discrete behavior exhibited may be standing idle for long periods of time and refusing to participate in the match, which is often referred to as "AFK."

Not only can a user identify a pre-specified behavior as feedback to send to the system 1000, and the player matching server system 1100, but the user can also provide a rating value, e.g., a score between 1 and 5, where 1 is for negative behavior and 5 is for positive behavior. The user can also add comments and also "commend" a player as will be described in more detail below. Other systems and methods for providing feedback are further described in U.S. patent application Ser. No. 13/424,670, now U.S. Patent Publ. No. 2013/0252737, entitled "Systems and Methods for User-Based Arbitration and Peer Review for Online Multiuser Systems," to Steve Mescon ("Mescon Application"), which is hereby incorporated by reference in its entirety.

Figure 5:
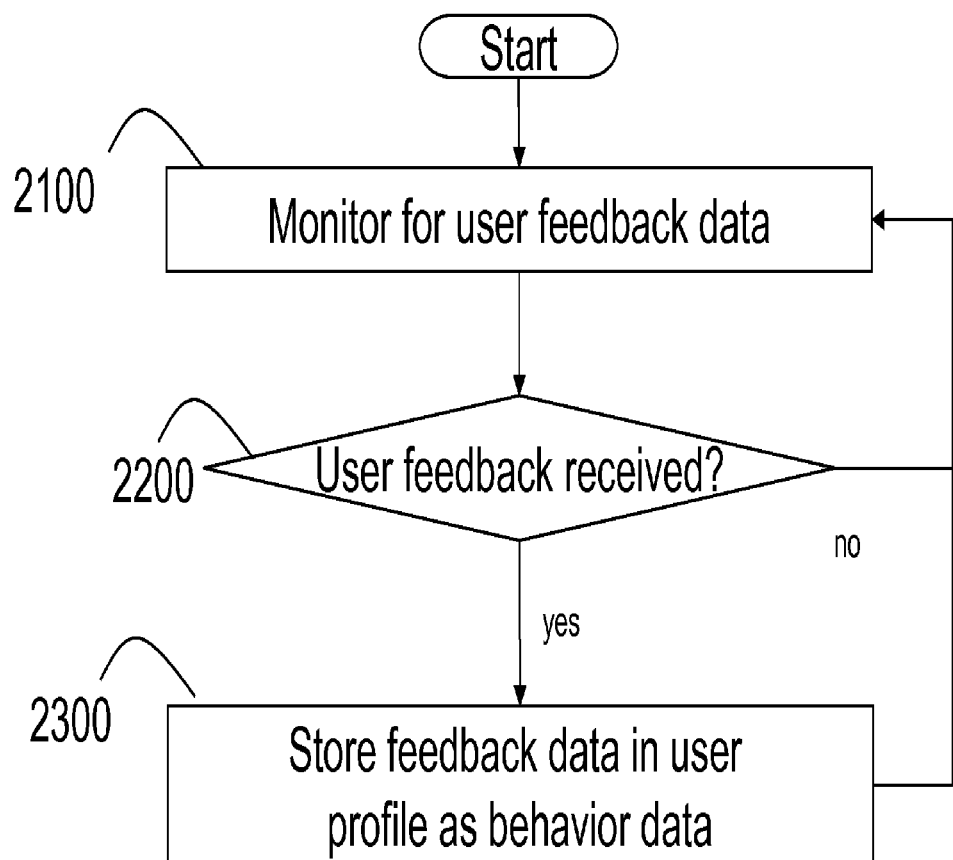
FIG. 5 is an electronic process enabling monitoring of user feedback data for multiuser online games in accordance with a preferred embodiment of the present invention.

Turning to FIG. 5, a flowchart 2000 illustrating an operation of the player matching server 1100 is shown to collect the behavior data, e.g., from the user interface 1150 described above. The player matching server 1100 monitors game session server interface 1120 for feedback data such as that described above (Action Block 2100), and if such data is received (Decision Block 2200), the data is stored in the user profile database 1110 with the user ID that the feedback is directed to (Action Block 2300).

As one of ordinary skill in the art would appreciate, a first user's profile in database 1110 may contain feedback information that the first user has received, e.g., from another player, and feedback information that the first user itself generated and reported. For instance, if the first user generated a report with feedback for another user, the first user's profile may include:

Skill level (e.g., the first user's objective demonstration of competence in one or more games played) and experience (e.g., how many years/months/games the first user has played);
Details of each game, e.g., mode and map, related to the first user's report(s);
The details of the report or feedback generated;
The number of times and frequency that the first user submits reports or generates feedback;
Accuracy of the first user's reports, e.g., whether other users have generated consistent or inconsistent feedback for the same user reported, particularly for the same game.

For a first user that has received feedback and/or reports from other users, the profile may include:

Skill level and experience;
Details of each game related to the feedback or report;
If the feedback is negative, then a harassment score of the first user may be stored, the details of which are described in the Mescon Application, incorporated by reference;
For positive feedback, current values for each commendation/positive report type (preferably, commendation counts from draft picked teammates are separated from those from blind picked teammates to account for bias in the aggregate commendation score).

To limit the players' ability to abuse the reporting system, certain restrictions in reporting and scoring may be implemented. For instance, for positive commendations, a quota for how many commendations that a user may give may be implemented, e.g., (N*3)+30, where N is the number of games played. Thus, for example, a player may start with 30 available commendations and then may accrue 3 additional commendations per game played. This means that a player can play 30 straight games and commend every single teammate in each game before reaching quota. If quota is reached, then the user can increase available commendations by playing more games. Other restrictions may include:

A user can promote any number of players on a team and choose any commendation type.
A user can promote any number of players on an opposing team, but there is only one "Honorable Opponent" option.
A user cannot promote itself.
A user cannot positively commend and negatively report a player.
A positive commendation from a draft picked teammate may be weighted less than a blind pick teammate to account for bias.
Mutual positive commendations may include an extra identifier, but if the mutual commendations came from draft picked teammates, such a mutual positive commendation may be weighted less than a blind picked teammate to account for bias.
The restrictions on negative reports are described in detail in the Mescon Application, incorporated by reference.
If a player of a draft picked team negatively reports a blind picked player, the report may be weighted less if multiple players from the draft picked team target the same blind picked player.

Player Matching Based on Behavior Data

Figure 6:
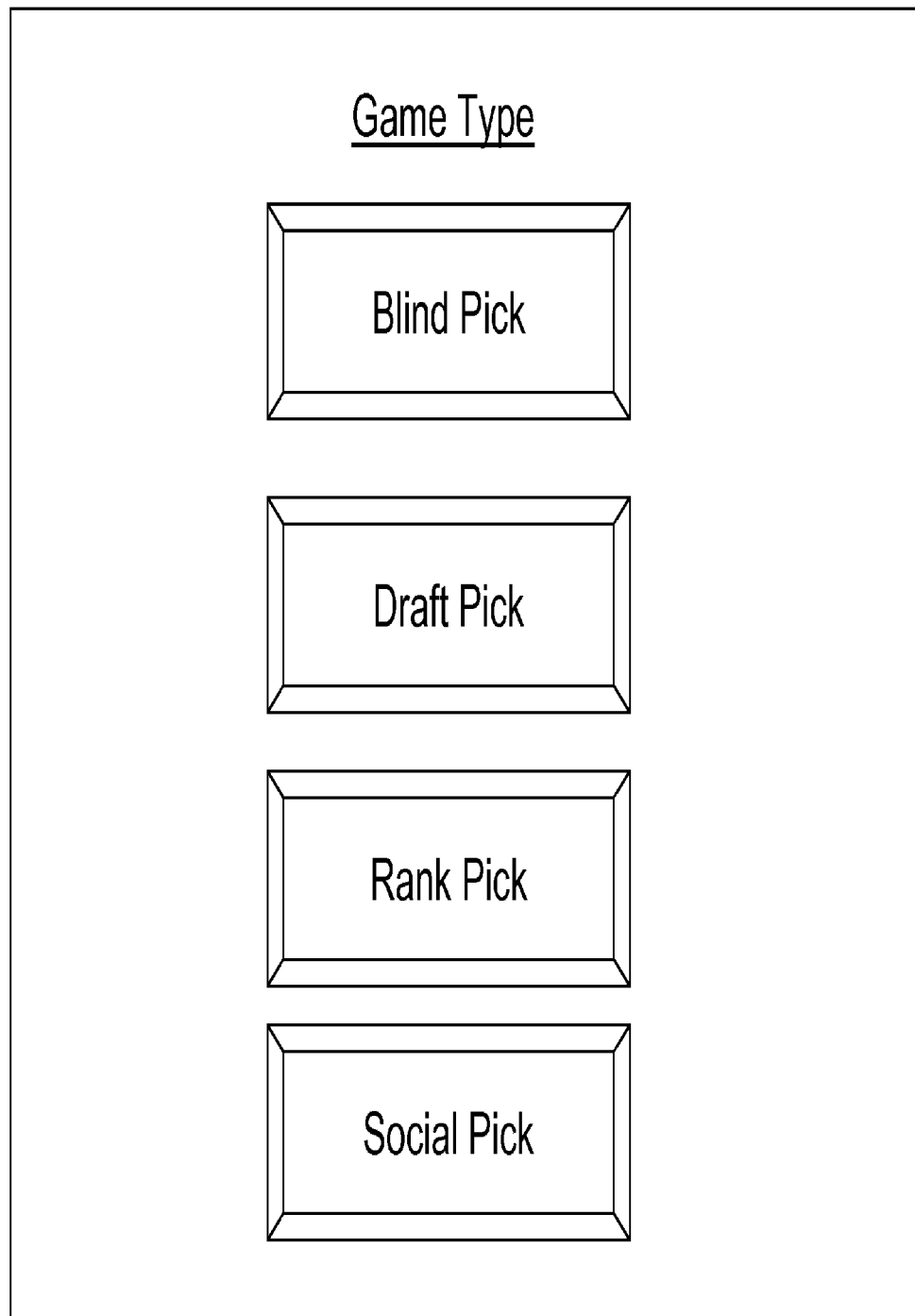
FIG. 6 is another user interface in accordance with a preferred embodiment of the present invention.

As mentioned above, it may be desirable to improve a user experience by matching players with compatible teammates and opponents. Such compatibility may be calculated not only by traditional characteristics such as skill level and experience, but also by behavior data such as the feedback data described above. Turning to FIG. 6, a user interface 1160 is provided that gives the user the option to actively select player matches based, at least in part, on behavior data, e.g., "Social Pick." Additionally, or in the alternative, the match system, e.g., player matching server 1100, may be employed by the systems' 1000 existing options, such as "Blind Pick" or "Rank Pick" by default without the user's knowledge.

Figure 7:
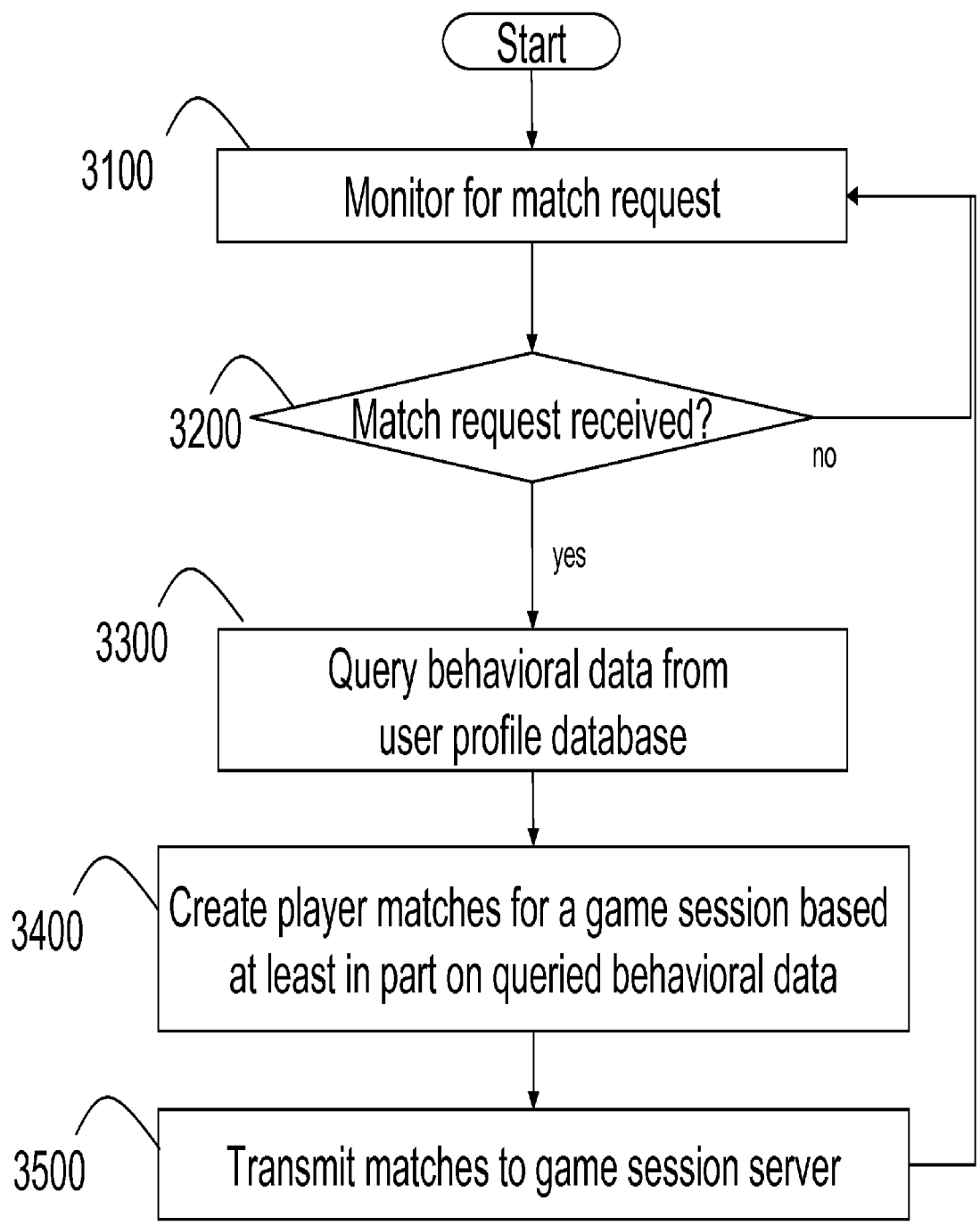
FIG. 7 is an electronic process enabling player matching in accordance with a preferred embodiment of the present invention.

Turning to FIG. 7, a flowchart 3000 illustrating another operation of the player matching server 1100 is shown. The player matching server 1100 will monitor the interface 1120 for a request from the game session server 140 to match players together to form teams and opponents for a particular game session (Action Block 3100). When a request is received, e.g., via interface 1120 (Decision Block 3200), the matching engine 1130 queries the user profile database 1110 for available behavior data for active players to assess compatibility (Action Block 3300). Using approaches described below, the matching engine 1130 creates player matches for teams and opponents for a particular game session (Action Block 3400), and transmits the matches to the game session server 140 (Action Block 3500) to initiate a game session with the matched players.

Figure 8:
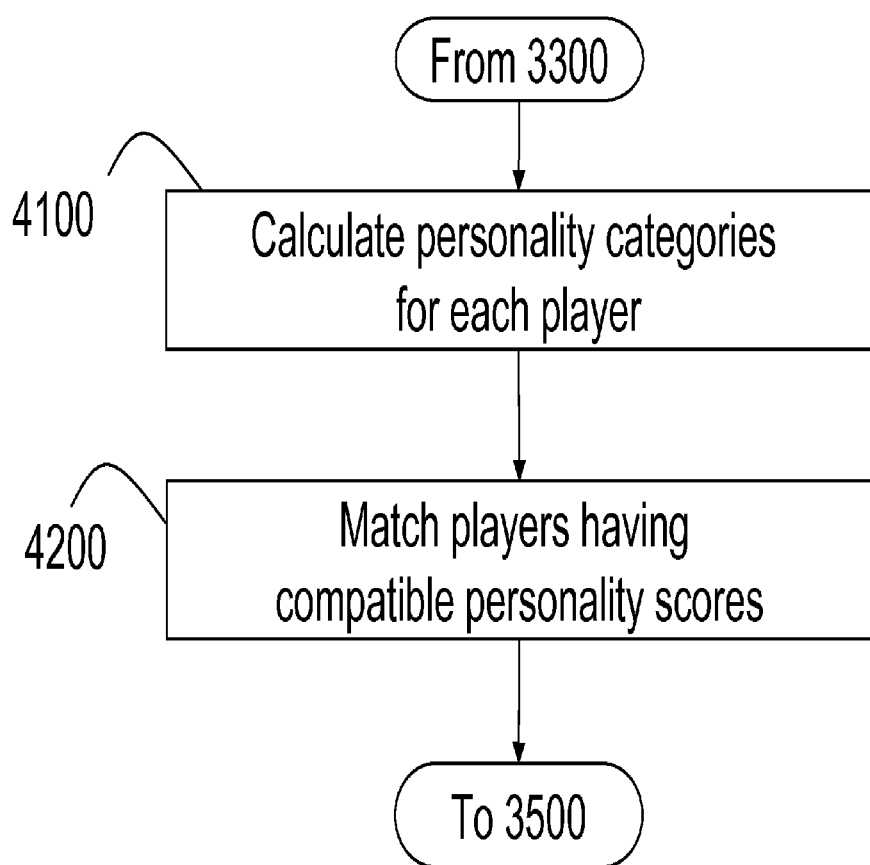
FIG. 8 is another electronic process enabling player matching in accordance with a preferred embodiment of the present invention.

At Action Block 3400, turning to FIG. 8, one electronic process 4000 to create player matches for teams and opponents is shown 4000. In this process 4000, the behavior data in database 1110 are filtered in to a number of pre-defined personality categories, e.g., Leaders, Teammates, Mentors, and Verbal Aggressors (Action Block 4100). A score may be generated for each active user at each category, and each category may have a pre-defined threshold. For example, a player with a high "Leader" score will have received over 500 positive commendations (e.g., by players using the interface 1150 in FIG. 4) over the player's lifetime with at least 25% Friendly Commendations, 25% Helpful Commendations, and 25% Team Oriented Commendations. A player with a high "Teammate" score will have received over 500 positive commendations with at least 25% Friendly Commendations and 25% Team Oriented Commendations. A player with a high "Mentor" score will have received over 500 commendations with at least 40% Friendly Commendations and 40% Helpful Commendations. Further, a player with a high "Verbal Aggressor" score may include over 50 negative reports, such as those shown in Mescon Application, with at least 25% of the reports being related to Verbal Abuse and 25% of the reports being related to Offensive Language.

In system 1000, the player matching engine 1130 at Action Block 3400 may dynamically match players based on personality scores, such as those described above (Action Block 4200). For example, the player matching engine 1130 may create a 5 player team that includes at least one player with a high Leader score and the remaining 4 players who have high Teammate scores in accordance with the formulas above.

In another embodiment, a player may select a "Coach Mode" pick. With this mode, players who have high Mentor scores can be matched with novice players having low skill and experience levels. Novice players can provide feedback on the Mentors through the approaches described above, e.g., with interface 1150 in FIG. 4, allowing the Mentors to potentially unlock rewards, as will be described below. In a preferred embodiment, novice players and Mentors are anonymous to each other when they first meet but can introduce each other's user IDs if they desire.

Figure 9:
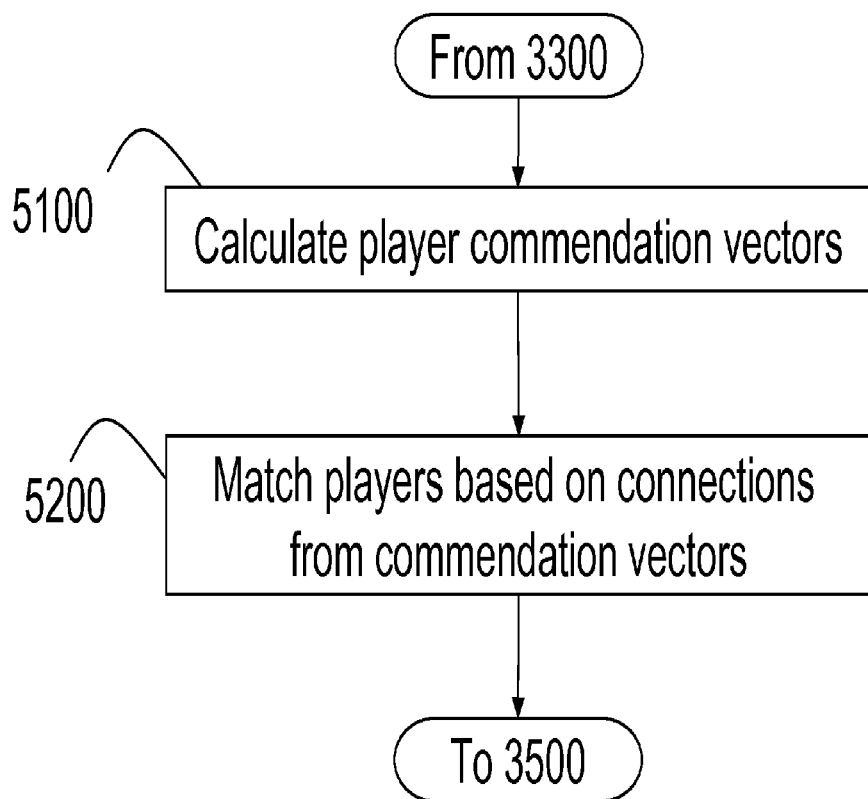
FIG. 9 is another electronic process enabling player matching in accordance with a preferred embodiment of the present invention.

Turning to FIG. 9, another process 5000 is shown for action block 3400. In this process 5000, the player matching engine 1130 may utilize the commendation link that a user can create using the "Commendation" button shown in FIG. 4 (Action Block 5100). A first player may select that button to associate with another player if that other player provided a generally positive experience during a game session they participated in. A commendation link or vector that identifies the player that initiated the commendation and the player that received it is stored with their respective user profiles in database 1110 as behavior data. This link or vector can be used by the player matching engine 1130 as behavior data to create matches for teams and opponents in subsequent games (Action Block 5200). One approach is to assess "degrees" of connections between two potential players based on the vectors as follows:

First degree: two players mutually commended each other in one or more previous games Second degree: a first player commended a second player From these calculations, additional degrees can be assessed:

Second degree: if a second player that a first player commended also mutually commends a third player (i.e., the second and third player mutually commended each other in one or more previous games), then the first and third player have a second degree connection.

Third degree:
If a second player that a first player commended commends a third player, then the first and third players have a third degree connection.
If a second player who has a second degree connection with a first player, and that second player mutually commends a third player, then first and third player will also have a third degree connection.

With these vectors in the database 1110, the player matching engine 1130 may query the database 1110 for players that have a first degree connection with the first player, followed by second and third degree connections if the first degree connections have been exhausted. If all such connections have been exhausted, then random shuffling or prior approaches may be employed.

In a preferred embodiment, the matching approaches described above can be performed in conjunction with "Rank Pick" as well. An example process 6000 is shown in FIG. 10. Players are first placed in a pool of other players that have comparable skill and experience levels (Action Block 6100). Then, from that pool of players, the players are matched based at least in part on their behavior data in database 1110 in accordance with one or more of the approaches described above (Action Block 6200).

In a system 1000 having millions of active players at any given time, the matching system described above 1100 may involve millions of data points to calculate. Thus, in a preferred embodiment, when a user logs in to join a game, the user's behavior data is immediately cached into an in-memory system database known in the art for fast access and a compatibility matrix is maintained to account for all of the players online in cached memory for fast calculations to enable seamless matching.

Commendation Rewards System

As described in the Mescon Application, incorporated by reference, in an effort to encourage or discourage certain behavior and interactions, a punishment and rewards system may be implemented based on peer review. With regard to the reward system, the commendation and behavior data described above may not only be utilized for player matching, but such data may also be utilized for implementing a reward system in accordance with the peer review system described in the Mescon Application. For example, reward badges (reflected as graphical icons for a players' view) may be issued by the system 1000 reflecting demonstration of being a great mentor, great sport, and/or great teammate. For opponents, a badge for being an honorable opponent may be issued. If an icon is displayed, a user may select the icon for details on how the badge was rewarded.

In calculating these rewards, like above, commendations from a Draft Picked player may be weighted less than a commendation from a Blind Picked player. Moreover, a decay may be implemented, where points are reduced when additional games are played to motivate players to continue with the positive behavior rather than cease when a plateau has been reached.

With such systems, the systems 1000 may enable a player to access certain behavior data associated with its user profile. For example, a player may be able to view its behavior data in the aggregate, e.g., the total number of type of commendations received. However, a certain amount of anonymity may be desirable to maintain the integrity of the player feedback systems, and thus, a player may be precluded from viewing the specific data and thresholds that determine whether a reward is granted to the player and/or the identity of the player(s) that initiated the feedback data.

Moreover, in a preferred embodiment, commendation numbers may not be updated for a player's view until after a game session. However, if a reward is provided, e.g., a great teammate reward, the badge is issued immediately If a player has been punished in accordance with the systems described in the Mescon Application, such rewards and badges may be removed.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for online gaming systems; however, the invention can be used for any multi-user online system in general. Additionally and obviously, features may be added or subtracted as desired. Accordingly, the invention is not to be restricted except in light of the attached claims and their equivalents.

What is claimed is:

1. A computer-implemented method for matching players of an online multiuser game system, the method comprising:
providing for display, by a gaming client associated with a first player of a plurality of players, a graphical user interface (GUI) after conclusion of a first gaming session including the first player and at least a second player of the plurality of players, wherein the GUI includes a player identifier field and a commendation field, the commendation field having a plurality of pre-defined commendation types that are each selectable as an identified commendation type;
receiving, by the gaming client, feedback data via the GUI, the feedback data having the second player in the player identifier field and a first commendation type of the plurality of pre-defined commendation types selected as the identified commendation type; and
communicating, by the gaming client, the feedback data to a game session server, wherein the game session server is configured to match the second player with at least a third player of the plurality of players based at least in part on a personality category determined for the second player, the personality category being determined based at least in part on the identified commendation type, a category score for the identified commendation type, and a plurality of pre-defined thresholds associated with a plurality of commendation types of the personality category; and
causing, by the gaming client, the game session server to initiate a second gaming session including the second player and at least the third player based on the match.

2. The method of claim 1, wherein the game session server is further configured to match the second player with the third player based on another personality category of the plurality of pre-defined personality categories determined for the third player.

3. The method of claim 2, wherein the other personality category is determined based on other feedback data communicated to the game session server, the other feedback data defining the third player and a second commendation type of the plurality of pre-defined commendation types.

4. The method of claim 1, wherein the game session server is further configured to store the communicated feedback data into behavior data of the second player.

5. The method of claim 4, wherein the game session server is further configured to calculate the category score of the first commendation type for the second player based on a number of times the first commendation type is identified in behavior data of the second player.

6. A non-transitory computer storage medium storing computer-useable instructions that, when used by at least one processor, cause the at least one processor to:
provide for display a graphical user interface (GUI) on a gaming client associated with a first player after a first gaming session including the first player and at least a second player of the plurality of players concludes,
wherein the GUI includes a player identifier field and a commendation field, the commendation field having a plurality of pre-defined commendation types that are each selectable as an identified commendation type;
receive feedback data via the GUI, the feedback data defining the second player in the player identifier field and having a first commendation type of the plurality of pre-defined commendation types selected as the identified commendation type; and
communicate the feedback data to a game session server, wherein the game session server is configured to determine one of a plurality of personality categories for the second player based on the identified commendation type, and match the second player with at least a third player of the plurality of players based at least in part on the determined personality category, a category score for the identified commendation type, and a plurality of pre-defined thresholds associated with a plurality of commendation types of the determined personality category; and
cause the game session server to initiate a second gaming session including the second player and at least the third player based on the match.

7. The medium of claim 6, wherein the game session server is further configured to match the second player with the third player based on another personality category of the plurality of pre-defined personality categories determined for the third player.

8. The medium of claim 7, wherein the other personality category is determined based on other feedback data communicated to the game session server, the other feedback data defining the third player and a second commendation type of the plurality of pre-defined commendation types.

9. The medium of claim 6, wherein the game session server is further configured to store the communicated feedback data into behavior data of the second player.

10. The medium of claim 9, wherein the game session server is further configured to calculate the category score based on a number of times the first commendation type is identified in behavior data of the second player.

11. A computerized system for matching players of an online multiuser game system, the system comprising:
at least one processor, and
at least one computer storage medium storing computer-useable instructions that, when used by at least one processor, cause the at least one processor to:
provide for display a graphical user interface (GUI) on a gaming client associated with a first player after a first gaming session including the first player and at least a second player of the plurality of players concludes,
wherein the GUI includes a player identifier field and a commendation field, the commendation field having a plurality of pre-defined commendation types that are each selectable as an identified commendation type;
receive feedback data via the GUI, the feedback data defining the second player in the player identifier field and having a first commendation type of the plurality of pre-defined commendation types selected as the identified commendation type; and
communicate the feedback data to a game session server, wherein the game session server is configured to determine one of a plurality of personality categories for the second player based on the identified commendation type and match the second player with at least a third player of the plurality of players based at least in part on the determined personality category, a category score for the identified commendation type, and a plurality of pre-defined thresholds associated with a plurality of commendation types of the determined personality category; and cause the game session server to initiate a second gaming session including the second player and at least the third player based on the match.

12. The medium of claim 11, wherein the game session server is further configured to match the second player with the third player based on another personality category of the plurality of pre-defined personality categories determined for the third player.

13. The medium of claim 12, wherein the other personality category is determined based on other feedback data communicated to the game session server, the other feedback data defining the third player and a second commendation type of the plurality of pre-defined commendation types.

14. The medium of claim 11, wherein the game session server is further configured to store the communicated feedback data into behavior data of the second player.

15. The medium of claim 14, wherein the game session server is further configured to calculate the category score based on a number of times the first commendation type is identified in behavior data of the second player, and match the second player with the third player based further in part on the calculated category score.

* * * * *